Jan. 23, 1934.    T. PARK    1,944,454
PNEUMATIC CURTAIN CONTROL FOR MOTOR CARS
Filed Feb. 6, 1933
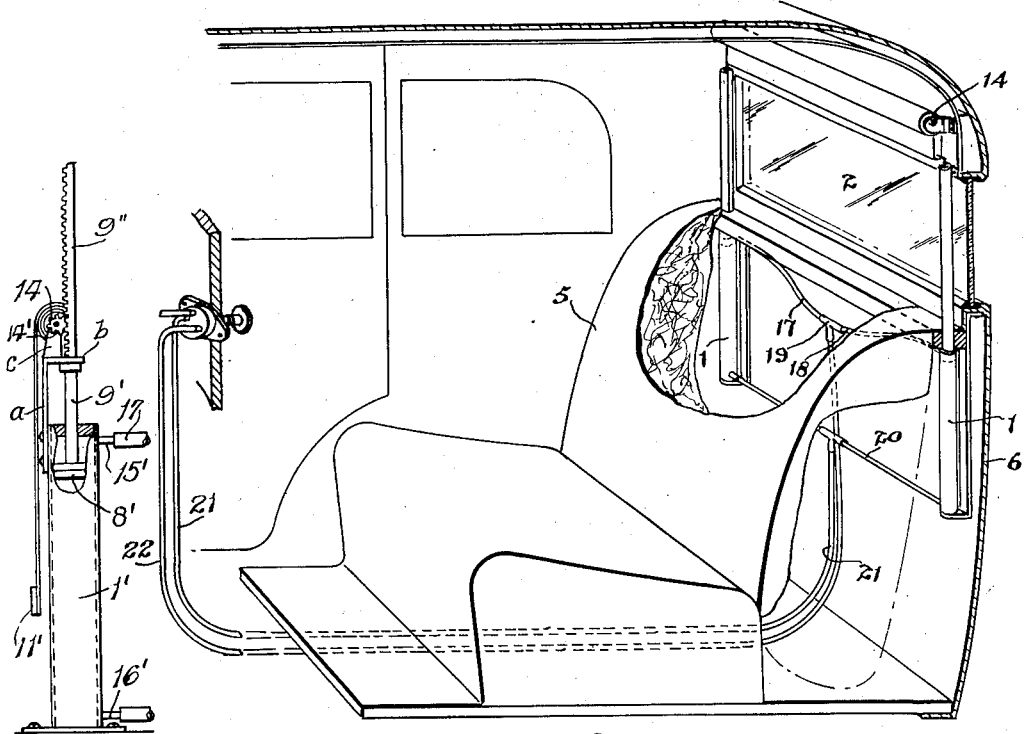
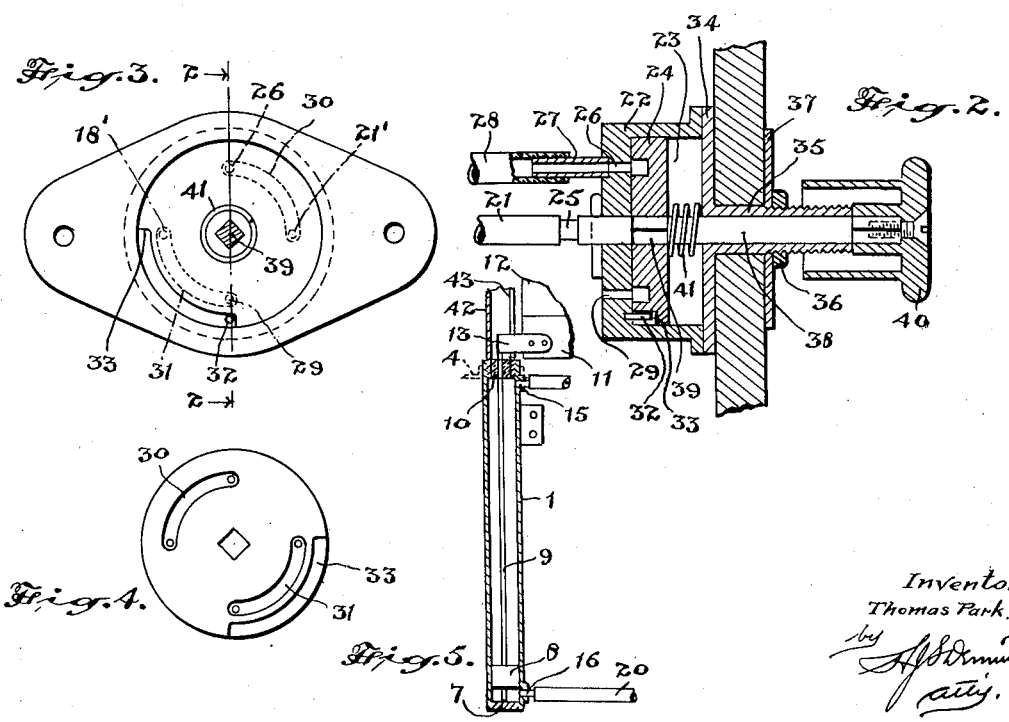
Inventor.
Thomas Park.

Patented Jan. 23, 1934

1,944,454

UNITED STATES PATENT OFFICE 1,944,454

PNEUMATIC CURTAIN CONTROL FOR MOTOR CARS

Thomas Park, Long Branch, Ontario, Canada

Application February 6, 1933. Serial No. 655,411

8 Claims. (Cl. 156—28)

The principal object of this invention is to enable the manipulation of the rear window curtain of a motor car from the front or driver's seat and to provide a simple form of apparatus which will function in a dependable manner.

A further important object is to provide a device of this nature which will be vacuum-operated and controlled, obviating the use of troublesome mechanical connections between the curtain and the point of control.

The principal feature of the invention consists in the novel arrangement of a pair of cylinders having their pistons operatively connected with the curtain at either side and in the novel manner of controlling the inlet and outlet of air to the respective ends of the cylinders to affect the positive movement of the pistons in unison in either direction.

In the drawing Figure 1 is a perspective sectional detail of the rear portion of a motor car body illustrating the application of the present invention thereto.

Figure 2 is a mid-sectional elevational view showing a preferred form of control valve for controlling the device and taken on the line 2—2 of Figure 3.

Figure 3 is a front elevational view with the control knob and front portion of the valve casing removed.

Figure 4 is an elevational view of the rotor element of the valve showing the ports therein.

Figure 5 is a mid-sectional elevational detail of one of the control cylinders and the connection of its piston with the curtain.

Figure 6 is a sectional elevational view on a reduced scale illustrating a modified form of the invention.

In the operation of a motor car on the highway it is frequently desirable or necessary to draw the rear curtain down to exclude the objectionable rays from the headlights of a vehicle which may be following closely behind, since such rays striking the inner surface of the windshield are reflected with considerable intensity back into the driver's eyes so that his effective vision of the road ahead is materially decreased.

The driver, if he is travelling alone, must either proceed very cautiously until the offending car has passed or bring the car to a complete stop in order to reach and draw the curtain. It is the object of the present invention to obviate this difficulty and to enable the ready manipulation of the rear curtain from the front or driver's seat.

In carrying the present invention into effect and in the form of the invention shown, I preferably provide a pair of cylinders 1 which are adapted to be mounted in a vertical position one at each side and forwardly of the rear window 2 of the motor car. These cylinders may be provided with suitable brackets 3 or may carry at the upper end a lateral flange 4 as indicated in Figure 5, or any other means may be provided for conveniently mounting the cylinders rigidly in position.

As illustrated in Figure 1, the cylinders will be mounted behind the rear upholstered cushion 5 within the back panel 6 of the car with their upper ends terminating preferably adjacent the lower extremity of the window 2.

The cylinders carry a bottom closure 7 and each has slidably mounted therein a piston 8.

A length of wire rod 9 is secured axially to the piston 8 of each cylinder and extends upwardly through the upper cylinder enclosure 10 which may be suitably packed around the rod 9 to minimize leakage.

The upper extremities of the rods 9 are suitably secured to the bottom cross strip 11 of the curtain 12 by the bracket extension 13. The curtain 12 will be mounted on the usual spring-return roller 14 from which the ratchet means normally applied will preferably be removed or rendered ineffective so that the blind will operate freely in either direction.

The length of the rods 9 is such that when the pistons 8 are at their lower position in the cylinders as indicated in Figure 5, the curtain will be drawn down completely to cover the rear window 2.

A tubular connection 15 extends from and communicates with the upper interior of each cylinder and a similar tubular connection 16 leads from the lower extremity of each cylinder.

A length of flexible or rubber tubing 17 connects the tubular extensions 15 and a branch tubular connection 18 connects therewith at 19 and leads forwardly to be connected with the control valve, presently to be described.

The lower tubular connections 16 are similarly connected by a length of tubing 20 which has a branch tubular connection 21 leading forwardly for connection with the control valve.

In the construction of control valve herein provided a casing 22 has a cylindrical bore 23 therein in which is snugly fitted a rotatable valve disc 24. The valving disc 24 engages on its inner side in flat surface-sealing contact with the bottom wall of the cylinder bore 23, which wall has a pair of ports 18' and 21' respectively, disposed preferably one at each side of the cylinder axis and these are connected respectively to the tubes 18 and 21 leading from the cylinder 1 by means of the short nipple extensions 25.

A port 26 similar to the ports 18' and 21' is formed in the bottom of the cylinder 22 and midway between the latter and spaced a corresponding distance from the axis of the cylinder and a nipple extension extends therefrom to which a length of tubing 28 in connected, which tubing is adapted to be connected with the intake or suction side of the motor car engine.

A port 29 is here shown provided in the bottom wall of the cylinder 23 diametrically opposite the port 26.

Provided in the rear or valving face of the rotatable disc 24 are a pair of arc-shaped recesses 30 and 31 which form ports on the opposite side of the disc axis. These ports are of such circumferential length as to establish connection between the ports in the bottom wall of the cylinder 23 as illustrated in Figure 3, and it will be seen that when the disc is turned to the position shown in Figure 3 with the port 30 registering with the ports 26 and 21' and the arc-shaped port 31 registering with the port 18' and 29, a passage will be established between vacuum tube 28 and its port through the rotor passage 30 to port 21' and tube 21, so that air within the cylinders 1 below the pistons 8 will be exhausted and the pistons thereby drawn downwardly to pull the curtain over the rear window 2.

Concurrently with this action it will be seen that the rotor port 31 connects the upper ends of the cylinders 1 through tube 18, port 18' with the atmospheric port 29 so that air will be admitted to the cylinders above the pistons to permit them being drawn downwardly by the vacuum influence on the other side.

When however, the rotor disc 24 is turned from a position in which it is shown in Figure 3 to that in which it is shown in Figure 4, the vacuum influence obtaining in tube 28 will be imparted to the cylinders 1 above the pistons 8 by reason of the connection established through port 30, 18' and tube 18, thus drawing the pistons upwardly, permitting the curtain to rise and be rolled upon the roller 14.

When the control valve is in this latter position the port 31 connects port 29 with port 21' permitting the air to enter the lower ends of the cylinders as they are drawn upwardly by the vacuum influence on the upper side.

A pin 32 operating in an arcuate slot 33 in the rotor limits the rotative movement thereof to insure its stopping at the desired point.

The cylinder casing 22 is preferably closed on its outward side by the cap member 34 which is here shown formed with an axial tubular extension 35 adapted to pass through the dash whereby the device may be conveniently mounted in position.

The outer end of the tubular extension is preferably threaded and provided with a sleeve nut 36 under which an indicator disc 37 may be clamped.

Rotatably mounted in the tubular extension 35 is a spindle 38 having a squared portion 39 nonrotatably engaging the valved disc 24, the outer end of the spindle being provided with a knob 39 by means of which the spindle is rotated either in a left or right direction.

Encircling the spindle 38 and compressed between the rotor 24 and cover 34, is a spring 41 which serves to hold the rotor with its inner face in close sealing engagement with the bottom of the cylinder bore 23.

It is preferable to provide a guard 42 extending above each of the cylinders to prevent injury to or bending of the rods 9, these being preferably of tubular form suitably secured to the upper ends of the cylinders and being slotted on their inner sides at 43 to receive and guide the bracket extensions 13 of the curtain.

A device such as described will be highly efficient in practice and provides for the ready manipulation of the rear curtain by the driver when the car is in motion.

No mechanical connections are required between the curtain and the control device and the tubes 18 and 21 which may be of rubber or metal can be carried forwardly completely out of sight.

Many variations in the actual structural details may be resorted to without departing from the spirit of the invention.

In the modified form of the invention illustrated in Figure 6, a cylinder 1' is shown provided with tubular outlets 15' and 16' corresponding with the outlets 15 and 16 of the cylinders 1, and a piston 8' has a piston rod 9' extending therefrom having a rack portion 9''. The roller 14 in this case has axially secured to one end thereof a small toothed pinion 14' in constant mesh with the rack 9'' so that movement of the piston 8' in either direction under the control of the valve means described is positively transmitted to the roller 14 to effect the raising and lowering of the curtain or blind.

A guide bracket $a$ is here shown extending above the cylinder and having a laterally turned lug $b$ forming a guide for the rack 9'' and having an upturned lug $c$ for rotatably supporting the pinion end of the roller 14. In this way the pinion and rack will be maintained in operative engagement.

The free end of the blind may be suitably weighted at 11', or light spring elements may be attached thereto to retain the unwound portion taut.

What I claim as my invention is:—

1. A pneumatic curtain control for motor cars, comprising the combination with the curtain, of a pair of cylinders mounted one at each side of said curtain, a piston reciprocable in each of said cylinders, valve means controlling simultaneously the application of fluid pressure to said pistons to move the same uniformly in the cylinders, and means operatively connecting said pistons individually to the respective sides of said curtain.

2. A pneumatic curtain control for motor cars, comprising the combination with the curtain, of a pair of cylinders mounted one at each side of said curtain and closed at the ends, a piston reciprocable in each of said cylinders, and operatively connected with the adjacent bottom corner of the curtain, a tube communicating with the upper end of each of said cylinders, a second tube communicating with the lower end of each of said cylinders, and valve means controlling the inlet and outlet of fluid pressure through said respective tubes to affect the simultaneous and uniform movement of the respective pistons in their cylinders in each direction.

3. A pneumatic curtain control for motor cars, comprising the combination with a curtain having a roller therefor, of a pair of cylinders mounted one at each end of said roller, pistons reciprocable one in each of said cylinders and operatively connected with the adjacent lower extremities of the curtain, valve means simultaneously controlling the inlet and outlet of fluid pressure to said respective cylinders to move said pistons in unison in each direction, and guide means extending between said cylinders and roller and imparting a guiding influence to the curtain.

4. A pneumatic curtain control for motor cars, comprising the combination with a curtain and roller therefor, of a pair of cylinders spaced apart and disposed in substantial alignment with the ends of said roller, a piston reciprocable in each of said cylinders, a rigid rod connected with each of said pistons and connected at their outer ends to the adjacent bottom corners of the curtain, valve means controlling the inlet and outlet of fluid pressure to both of said cylinders simultaneously to effect the movement of the respective pistons in unison in each direction, and a guide member extending beyond each of said cylinders and forming a protective enclosure for said piston rods when the latter are extended.

5. A pneumatic curtain control for motor cars, comprising the combination with a roller curtain, of a cylinder mounted in transverse alignment with one end of the roller of the curtain and having both ends closed, a piston reciprocable in said cylinder and having a rigid piston rod extension therebeyond, means for controlling the inlet and outlet of fluid pressure to the respective ends of said cylinder to effect positive reciprocation of the piston rod in either direction, and means forming an operative connection between said rigid piston rod extension and said curtain.

6. A pneumatic control for motor car curtains, comprising the combination with a roller having a curtain adapted to be rolled thereon, a cylinder, a piston reciprocable in said cylinder and having a rigid rod extension, means controlling the inlet and outlet of fluid pressure to said cylinder to effect the positive movement of the piston in either direction, said piston rod extension having rack teeth thereon, and a toothed pinion connected with said roller and meshing with said rack teeth whereby the roller is positively operated in either direction by the movement of said piston.

7. A pneumatic curtain control for motor cars, the combination of a pair of cylinders, pistons reciprocable in said cylinders and separately connected with the lower extremities of the curtain, said cylinders being closed at either ends, a valve member having a port adapted to communicate with a source of partial vacuum, a pair of ports spaced from the aforesaid port, one of said latter ports being connected with the corresponding ends of each of said cylinders and the other of said latter ports being connected with the other ends of each of said cylinders, said valve having a port leading to atmosphere, and a movable valve member controlling the connection and disconnection of said ports to effect positive reciprocation in unison of said respective pistons in each direction.

8. A pneumatic control for roller curtains, comprising the combination with a roller having a curtain adapted to wind thereon, of a cylinder, a piston in said cylinder having a rack connected therewith, means for controlling the inlet and outlet of fluid pressure to said cylinder to move the piston and rack, and a pinion on said roller engaging said rack.

THOMAS PARK.